Patented May 5, 1936

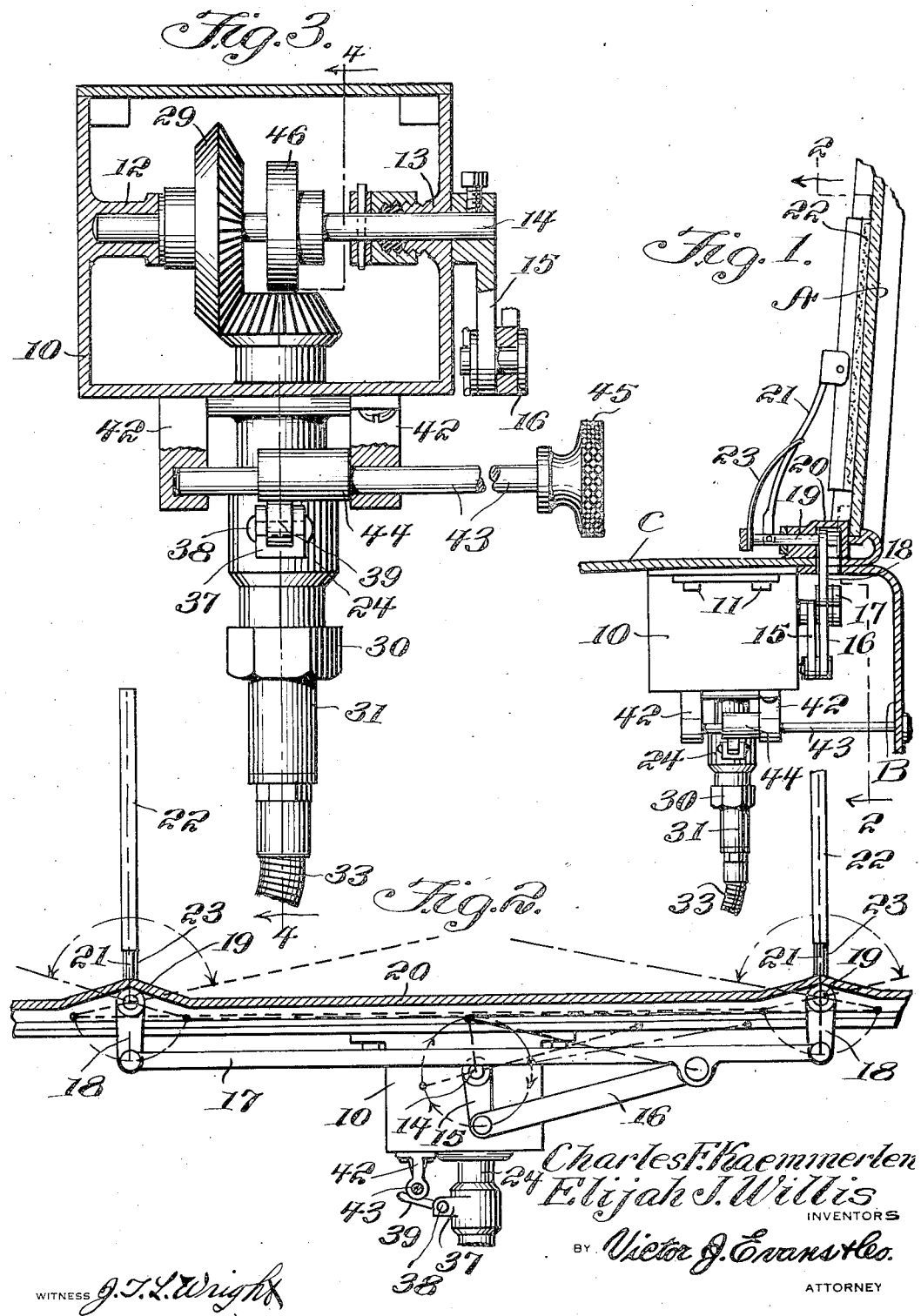

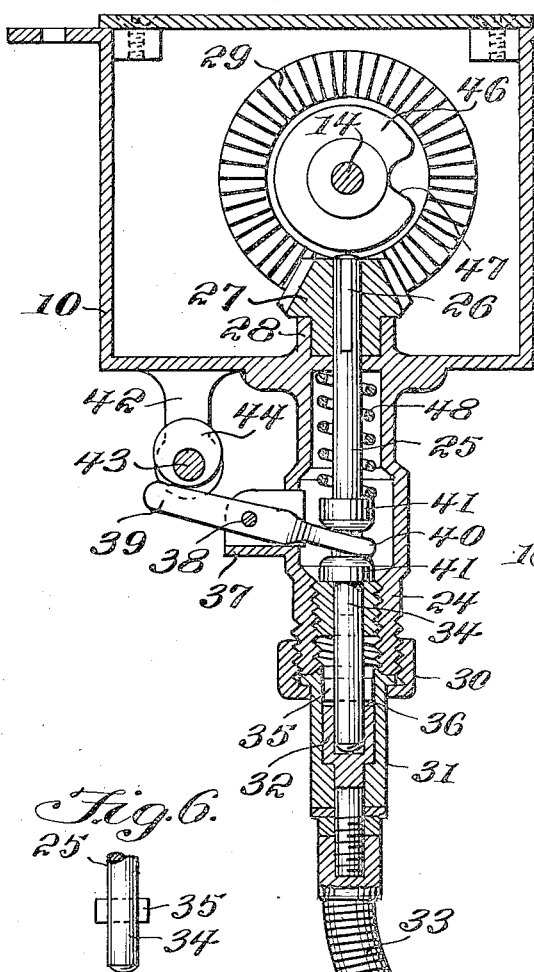
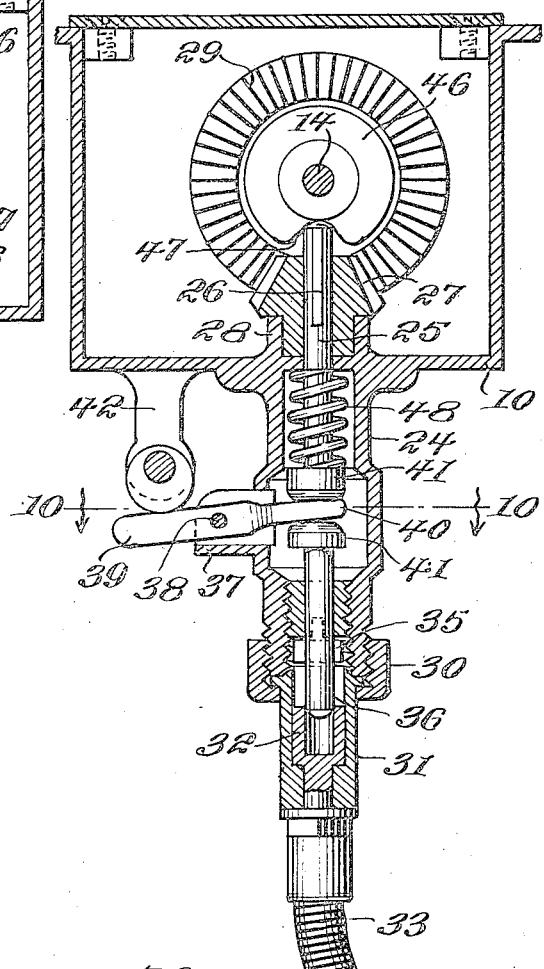
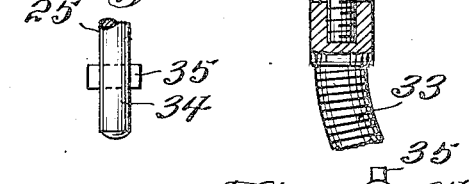
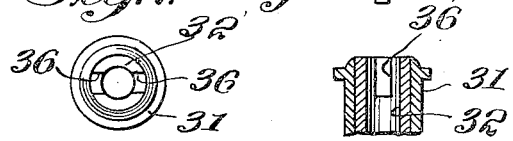
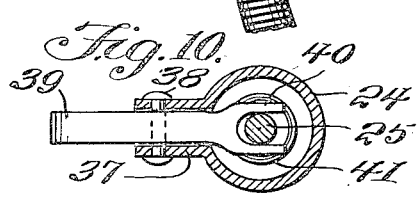

2,039,598

UNITED STATES PATENT OFFICE 2,039,598

WINDSHIELD WIPER

Charles F. Kaemmerlen and Elijah J. Willis,
Morehead City, N. C.

Application December 30, 1935, Serial No. 56,778

3 Claims. (Cl. 192—138)

The invention relates to a windshield wiper and more especially to a gear operated type duplex windshield wiper.

The primary object of the invention is the provision of a windshield wiper of this character wherein through the use of a flexible drive shaft the wiper arms will be caused to operate so that a wiper or wipers will be actuated for the removal of moisture or water or other obstructions from a windshield of a motor vehicle, the mechanism for operating the wiper arms being of novel construction.

Another object of the invention is the provision of a windshield wiper wherein the wiper arms can be held in a position to avoid interference with view through the windshield when the same are inactive, there being wipers operating in unison when active and the activity of such wipers is controlled by hand in a unique manner, the control being in convenient reach to an operator of a motor vehicle having the wipers equipped therewith.

A further object of the invention is the provision of a windshield wiper of this character which is comparatively simple in construction, thoroughly reliable and efficient in operation, readily and conveniently applied to various styles of windshields either of the perpendicular or sloping types, strong, durable, and inexpensive to manufacture and install.

With these and other objects in view, the invention consists in the features of construction, combination and arrangement of parts which will be hereinafter fully described, illustrated in the accompanying drawings which disclose the preferred embodiment of the invention and pointed out in the claims hereunto appended.

In the accompanying drawings:

Figure 1 is a fragmentary vertical sectional view through a windshield and hood and instrument board of a motor vehicle showing the windshield wiper constructed in accordance with the invention applied.

Figure 2 is a fragmentary sectional view taken on the line 2—2 of Figure 1.

Figure 3 is a vertical sectional view through the gear box of the windshield wiper.

Figure 4 is a sectional view on the line 4—4 of Figure 3 looking in the direction of the arrows.

Figure 5 is a view similar to Figure 4 showing certain of the parts in a shifted position.

Figure 6 is a fragmentary elevation of the clutch pin end of the driven shaft for the wiper.

Figure 7 is a plan view of the cooperating end of the driving shaft for said clutch pin end.

Figure 8 is an end view of the clutch pin.

Figure 9 is a side elevation partly in section of the structure shown in Figure 7.

Figure 10 is a sectional view on the line 10—10 of Figure 5 looking in the direction of the arrows.

Similar reference characters indicate corresponding parts throughout the several views in the drawings.

Referring to the drawings in detail, A designates generally a portion of a windshield, in this instance of the forwardly inclined type, B a portion of the instrument board and C a portion of the hood, respectively, of a motor vehicle, such as a bus, auto, truck, aeroplane, boat, train, etc. Beneath the hood seat is arranged a gear box 10 which is made secure by fasteners 11 to the said hood and has interiorly thereof the bearings 12 and 13, respectively, for an arbor 14, which has one end projected exteriorly of the box 10 for the fixing thereto of a detachable crank 15 pivoted to a link 16 which is also pivoted to a connecting rod or bar 17. This bar or rod 17 has pivotal connection with the arms 18 jointed with a pair of turning spindles 19 which are journaled in the frame 20 of the windshield A. These spindles 19 are spaced the required distance apart at opposite sides with relation to the box 11 and pivotally support wiper arms 21 carrying wiper blades 22 which play against the outer face of the windshield glass for the removal of moisture and rain or other obstructions therefrom. Each arm 21 has acting thereon a leaf spring 23 which serves to hold the blade in close contact with the glass of the windshield during the working of the wiper.

Formed at the bottom of the box 10 is a tubular coupling extension 24 in which is arranged a driven shaft 25 slidably splined at 26 in a pinion 27 rotatably held in a journaled boss 28 formed interiorly on the bottom of the box 10. This pinion 27 meshes with a beveled gear 29 fixed to the arbor 14 within said box 10. The coupling extension 24 has threaded thereon a coupling nut 30 for the fitting with this extension of a coupling nipple 31 in which is journaled a socketed rotatable clutch part 32 fitted with a flexible driving shaft 33, the latter being driven from any movable or rotating part of the motor vehicle, only a portion of the shaft 33 being illustrated in the drawings.

The driven shaft 25 is formed with a clutch pin end 34 which is accommodated within the socketed clutch piece 32 and carries a cross gib or key 35 for engagement in companion notches 36 provided in the clutch part 32 so that the shafts 25 and 33 can be clutched and unclutched with and from each other in a manner presently described.

Formed on the extension 24 is a bearing 37 in which is swingingly mounted by a pivot 38 a throw lever 39 it having a fork 40 loosely saddling the shaft 25 between abutments 41 and this lever 39 when shifted slides the shaft 25 either clutched with or unclutched from the shaft 33. Carried at the bottom of the box 10 are brackets or hangers 42 in which is journaled a control axle 43 for a cam or eccentric 44 which latter operates directly on the lever 39 when the axle 43 is turned for the shifting of the shaft 25 in the extension 24 and in this manner the said lever 39 is actuated for clutching and unclutching actions. The axle 43 carries a turning knob 45 which is arranged with relation to the instrument board B convenient for hand manipulation by an operator of the motor vehicle so that by manipulating the knob 45 the windshield wiper will be stopped and started.

The arbor 14 within the box 10 has a notched disk 46 fixed thereto and its notch 47 is adapted to accommodate the upper end of the shaft 25 when the latter is shifted by the lever 39 to unclutch this shaft from the shaft 33 and in this manner the wiper arms 21 will be latched in lowermost position with respect to the windshield A so as to not interfere with view therethrough when the windshield is inactive, the lowermost position of the wiper arms 21 being shown by dotted lines in Figure 2 of the drawings.

When the shaft 25 is clutched with the shaft 33 the motion will be imparted to the wiper arms 21, these being caused to operate in unison through the connecting rod or bar 17 and when it is desired to render the wiping arms 21 inactive or passive the lever 39 is operated by manipulating the hand knob 45 so that the shaft 25 will become unclutched from the shaft 33 and this shaft 25 will be thrown to a position to have its upper end engaged in the notch 47 in the disk 46 and thus lock the wiper arms 21 inactive and in lowermost position.

Surrounding the shaft 25 interiorly of the extension 24 is a coil tensioning spring 48 which plays against the abutment 41 next thereto and the bottom of the box 10 and this spring 48 functions to maintain the lever 39 in continuous contacting relation to the eccentric or cam 44 so that there will be no lost motion between the said lever and the cam.

What is claimed is:

1. In a wiper of the character described, a driven shaft, a driving shaft, a shiftable shaft for detachable coupling with the driving shaft, gears operatively connecting the shiftable shaft and driven shaft together, and a notched disk fixed to the driven shaft and having its notch receiving the shiftable shaft on uncoupling of the latter from the driving shaft.

2. In a wiper of the character described, a driven shaft, a driving shaft, a shiftable shaft for detachable coupling with the driving shaft, gears operatively connecting the shiftable shaft and driven shaft together, a notched disk fixed to the driven shaft and having its notch receiving the shiftable shaft on uncoupling of the latter from the driving shaft, a lever operative for moving the shiftable shaft, a handturned axle, and a cam on said axle and active upon the lever for operating the same.

3. In a wiper of the character described, a driven shaft, a driving shaft, a shiftable shaft for detachable coupling with the driving shaft, gears operatively connecting the shiftable shaft and driven shaft together, a notched disk fixed to the driven shaft and having its notch receiving the shiftable shaft on uncoupling of the latter from the driving shaft, a lever operative for moving the shiftable shaft, a handturned axle, a cam on said axle and active upon the lever for operating the same, and a spring acting upon the shiftable shaft to normally hold the same coupled with the driving shaft.

CHARLES F. KAEMMERLEN.
ELIJAH J. WILLIS.